United States Patent

[11] 3,625,939

| [72] | Inventors | Horst D. Schell;<br>Victor F. Ghetie, both of Bucharest, Romania |
|---|---|---|
| [21] | Appl. No. | 811,611 |
| [22] | Filed | Mar. 28, 1969 |
| [45] | Patented | Dec. 7, 1971 |
| [73] | Assignee | Institutul De Biochimie<br>Bucharest, Romania |
| [32] | Priority | Mar. 30, 1968 |
| [33] |  | Romania |
| [31] |  | 57,503 |

[54] PREPARATION OF AGAROSE BASED CATION-EXCHANGERS
3 Claims, No Drawings

| [52] | U.S. Cl. | 260/209.6, 260/234 R |
|---|---|---|
| [51] | Int. Cl. | C08b 19/10 |
| [50] | Field of Search | 260/209.6, 234 |

[56] References Cited

UNITED STATES PATENTS

| 3,281,409 | 10/1966 | Blethen | 260/209 |
|---|---|---|---|
| 3,437,652 | 4/1969 | Campbell et al. | 260/234 |
| 3,437,653 | 4/1969 | Curtin et al. | 260/234 |

FOREIGN PATENTS

| 573,589 | 11/1945 | Great Britain | 260/209.6 |
|---|---|---|---|

*Primary Examiner*—Donald E. Czaja
*Assistant Examiner*—Ronald W. Griffin
*Attorney*—Spencer & Kaye ABSTRACT: The invention deals with the preparation of new acid ion exchangers of medium strength derived from agarose. The procedure for obtaining these derivatives, according to the invention, consists in introduction phosphate groups either into the simple agarose molecule or into agarose cross-linked by glyceric bridges by treatment in alkaline medium at about 30° C. with phosphorous oxychloride dissolved in ethyl ether.

PREPARATION OF AGAROSE BASED CATION-EXCHANGERS

The invention deals with new synthetic derivatives or agarose applicable in ion exchanging chromatography These synthetic derivatives can be used for the study and separation of proteins of different origins, of some enzymes, for the chromatography of inorganic cations, etc.

Similar products are known, however, obtained from cellulose and destined for similar purposes.

The present invention extends the range of products which are used in chromatographic analysis by achieving new acid ion exchangers of medium strength.

The procedure for obtaining these derivatives, according to the invention, consists in introducing phosphate groups

hereinafter referred to by the letter P, either into the simple agarose molecule or into agarose cross-linked by glyceric bridges.

Two examples of the invention are given as follows:

EXAMPLE 1

Ten grams agarose are introduced into 35 ml. of 10 N sodium hydroxide solution chilled down to 0° C. The mixture is homogenized with a glass-rod during 60 minutes and 5 ml. of water are added while continuously homogenizing; the mass obtained and the reaction vessel containing such mass are then introduced into a water bath, at 25°–30° C. During about 40–60 minutes, 8 ml. of phosphorus oxychloride

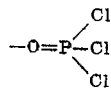

dissolved in 16 ml. of ethyl ether are then added drop by drop, while continuously mixing up the reaction mixture with a glass rod. If the reaction is too violent, dropping of the phosphorus oxychloride is interrupted for some time so that the temperature do not exceed 30°–35° C. After the end of the reaction the product is suspended in 200 ml. of water chilled down to about 3°–4° C. The suspension obtained is centrifuged, washed again with 200 ml. of chilled water, twice with 60 percent ethanol, also by centrifugation, dehydrated with ethanol or/and acetone and dried. Ten grams phosphate-agarose (P-agarose) is obtained, as a white powder with a phosphorus content of about 0.6 meq./g.

EXAMPLE 2

Example 1 is repeated using, however, agarose cross-linked by glyceric bridges (agarose X–7,5 of 50–100 mesh). After the end of the reaction the product is washed by decanting it with much distilled water, until neutral reaction pH7 and then, dehydrated with ethanol or/and acetone on a filter funnel. Ten grams perfectly white cross-linked phosphate-agarose (P-agarose X) are obtained, with a phosphorus content of about 0.3 meq./g.

In the above examples, the amounts of phosphorus oxychloride which are added to the reaction mixture can be varied thus obtaining products which differ from each other by their physico-chemical and mechanical properties. However, it should be recalled that phosphorus oxychloride can be added in higher amounts only to cross-linked agarose, in contrast to simple agarose which with the increase of oxychloride amounts yields products increasingly soluble in water.

Derivatives obtained from simple agarose, according to the present invention, are soluble in hot solutions yielding by chilling gels which can be converted into granules by means of known literature methods.

Derivatives obtained, according to the present invention, from cross-linked agarose are insoluble even in hot water solutions. In order to obtain particles of a certain size their gels are first mechanically crumbled, then dehydrated, dried and selectively sieved for obtaining fractions of desired granulation.

The present invention has the advantage that by introducing phosphate groups into molecules of simple or cross-linked agarose new acid ion-exchangers of middle strength are obtained which, owing to their dibasic active groups are particularly suited for the chromatographic analysis of basic proteins and for inorganic cation chromatography.

We claim:

1. A process for the preparation of phosphate esters useful in ion-exchanging chromatography which comprises treating agarose or agarose cross-linked by glyceric bridges in alkaline medium at about 30° C. with phosphorus oxychloride dissolved in ethyl ether and recovering the resultant phosphate ester from the reaction medium.

2. The process according to claim 1 wherein the material which is treated is agarose.

3. The process according to claim 1 wherein the material which is treated is agarose cross-linked by glyceric bridges.

* * * * *